US 6,892,169 B1

(12) United States Patent
Campbell et al.

(10) Patent No.: US 6,892,169 B1
(45) Date of Patent: *May 10, 2005

(54) SYSTEM AND METHOD FOR AUTOMATICALLY DESIGNING COMMUNICATIONS CIRCUITS

(75) Inventors: David C. Campbell, Allen, TX (US); Brenda D. Dunn, Frisco, TX (US); Mark W. McGuire, Flower Mound, TX (US); Joseph A. Peterson, Frisco, TX (US); John P. Reilly, Plano, TX (US); Mary Kim Westervelt, Plano, TX (US)

(73) Assignee: Metasolv Software, Inc., Plano, TX (US)

(*) Notice: Subject to any disclaimer, the term of this patent is extended or adjusted under 35 U.S.C. 154(b) by 960 days.

This patent is subject to a terminal disclaimer.

(21) Appl. No.: 09/736,693

(22) Filed: Dec. 13, 2000

Related U.S. Application Data

(60) Provisional application No. 60/232,324, filed on Sep. 13, 2000.

(51) Int. Cl.[7] .............................................. G06F 17/50
(52) U.S. Cl. .............................. 703/1; 716/12; 370/361; 379/272
(58) Field of Search .......................... 703/1; 716/1–12; 370/351; 379/272

(56) References Cited

U.S. PATENT DOCUMENTS

| | | | |
|---|---|---|---|
| 5,095,480 A | | 3/1992 | Fenner ....................... 370/94.1 |
| 5,359,649 A | * | 10/1994 | Rosu et al. ............. 379/221.07 |
| 5,615,254 A | | 3/1997 | Qiu et al. .................... 379/221 |
| 5,862,344 A | | 1/1999 | Hart ....................... 395/200.68 |
| 5,923,659 A | | 7/1999 | Curry et al. ................ 370/401 |
| 6,091,720 A | | 7/2000 | Bédard et al. .............. 370/351 |
| 6,131,124 A | * | 10/2000 | Nakatsugawa .............. 709/245 |
| 6,169,515 B1 | | 1/2001 | Mannings et al. ....... 342/357.1 |
| 6,295,634 B1 | * | 9/2001 | Matsumoto .................. 716/12 |
| 6,330,250 B1 | | 12/2001 | Curry et al. ................. 370/467 |
| 6,381,647 B1 | | 4/2002 | Darnell et al. .............. 709/232 |
| 6,397,040 B1 | | 5/2002 | Titmuss et al. ............. 455/67.1 |
| 6,477,526 B2 | | 11/2002 | Hayashi et al. ................ 707/4 |
| 6,643,837 B2 | * | 11/2003 | Campbell et al. ............. 716/12 |

FOREIGN PATENT DOCUMENTS

JP  02002057676 A  *  2/2002

OTHER PUBLICATIONS

A.F. Jones, "Integration of Independently Designed Military Communication Systems," IRE Transactions on Communications Systems, pp. 312–316, Sep. (Received by the PGCS, Dec. 23, 1960).

* cited by examiner

*Primary Examiner*—Albert W. Paladini
(74) *Attorney, Agent, or Firm*—Baker Botts L.L.P.

(57) ABSTRACT

A software interface used in designing communications circuits receives input from a user (20). In response, the software interface initiates accessing of a route plan (16) comprising a first route point group (38) associated with a first circuit end point (34), a second route point group (38) associated with a second circuit end point (34), and one or more routes (32) connecting the first and second route point groups (38). Each route (32) is available for use in designing the circuit. The software interface also initiates selection of a route (32) according to the route plan (16) and initiates the automatic assignment of the selected route (32) to the circuit in designing the circuit. The software interface provides information to the user (20) reflecting assignment of the route (32) to the circuit. The route plan (16) may be selected from among multiple route plans (16) according to a service application (14) automatically derived from an associated circuit order. The software interface may initiate assignment of equipment to the circuit at one or more points along the selected route (32) according to an equipment assignment template (18) specifying characteristics of the equipment. The template (18) may be selected from among multiple templates (18) according to a service application (14).

36 Claims, 5 Drawing Sheets

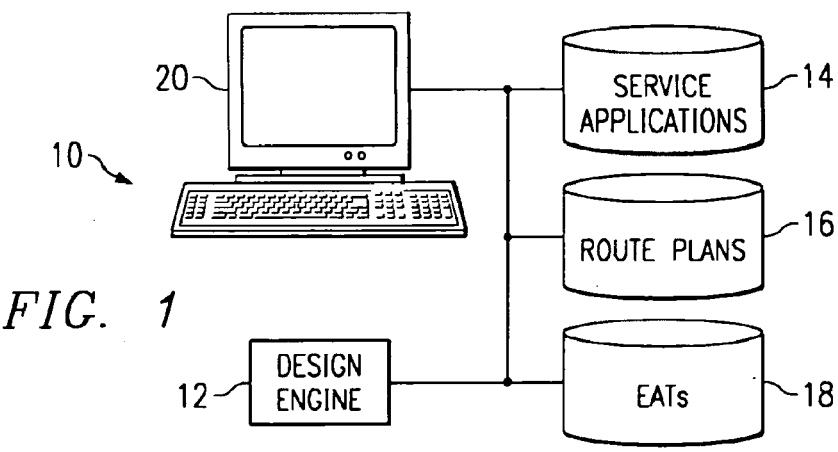
FIG. 1
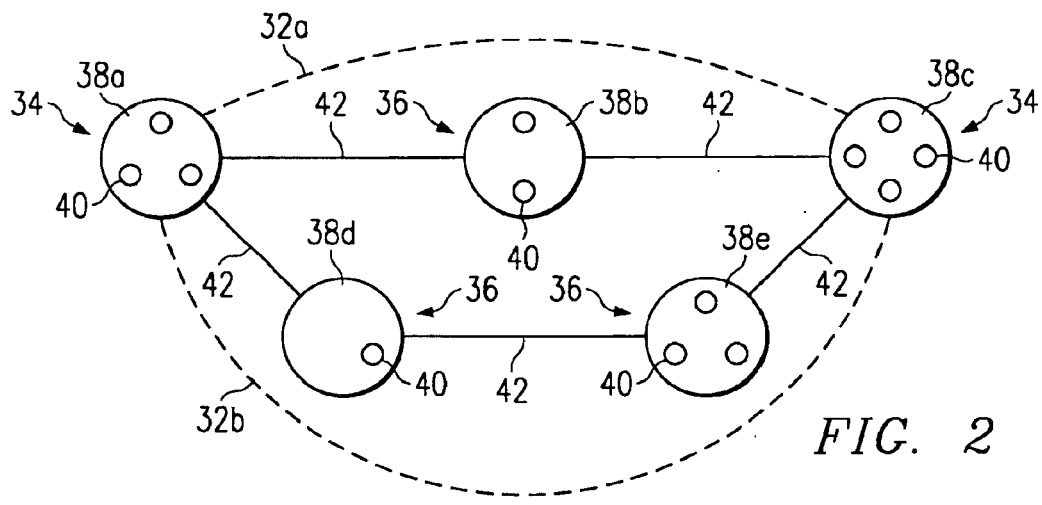
FIG. 2
FIG. 3

SYSTEM AND METHOD FOR AUTOMATICALLY DESIGNING COMMUNICATIONS CIRCUITS

CROSS-REFERENCE TO RELATED APPLICATIONS

This application claims the benefit under 35 U.S.C. § 119(e) of U.S. Provisional Application Ser. No. 60/232,324, filed Sep. 13, 2000.

This application is related to U.S. application Ser. No. 09/736,902 entitled "System and Method for Automatically Designing Communications Circuits" filed Dec. 13, 2000 by David C. Campbell, Brenda D. Dunn, Mark W. McGuire, Joseph A. Peterson, John P. Reilly, Mary Kim Westervelt, now U.S. Pat. No. 6,643,837, and U.S. application Ser. No. 09/736,903 entitled "System and Method for Designing Diverse Communications Circuits" filed Dec. 13, 2000 by David C. Campbell and Mary Kim Westervelt, now U.S. Pat. No. 6,802,044.

TECHNICAL FIELD OF THE INVENTION

The invention relates in general to the field of communications and in particular to a system and method for automatically designing communications circuits.

BACKGROUND OF THE INVENTION

Network plans for voice, data, and other communications networks are typically developed by network planning personnel based on demand, cost, traffic patterns, load balancing, and other factors. The output of the network planning process is usually a collection of route plans each specifying one or more routes between two circuit end points in the network and including any intermediate points the circuit will pass through between its end points. Optimal utilization of available network capacity is desired. Accordingly, once the network has been fully planned, separate provisioning personnel use the route plans to design circuits such that the network, as it is actually provisioned, matches the network plan as closely as possible. The circuit designers must take into account a number of possibly competing considerations to arrive at a design based on their experience and judgment that, it is hoped, satisfies the considerations as optimally as possible. The requirement that designers be intimately familiar with networks may often limit the ability of network providers to transfer personnel into or out of design positions, hampering flexibility within these organizations.

Even with the availability of prior software tools, these manual circuit design techniques have been relatively difficult, slow, inconsistent, and otherwise inefficient in their implementation. When facilities, equipment, or other circuit elements associated with an existing circuit are added, deleted, modified, or otherwise acted upon, the design must be re-validated using the same inefficient processes. Perhaps just as important, there are few if any controls on the manner in which a circuit is designed. The design, and any aspects of the design that violate the corresponding plan but are permitted to exist in the network, are left almost exclusively to the designer. As an example, the designer might choose to assign a route plan to a circuit despite the fact, or perhaps without knowledge of the fact, that the assignment violates one or more diversity rules for the circuit being designed. If made erroneously, such decisions may undermine the reliability of the network and result in substantial losses to the network provider and its customers. Prior techniques do not readily allow network planning intelligence to be incorporated into the route selection process. As communications needs continue to expand, and network providers seek ways to respond more rapidly, consistently, and efficiently to growing demand for circuits, these and other problems are exacerbated. These and other deficiencies have made prior techniques inadequate for the needs of many network providers.

SUMMARY OF THE INVENTION

According to the present invention, disadvantages and problems associated with previous techniques for designing communications circuits are substantially reduced or eliminated.

According to one embodiment of the present invention, a software interface for use in designing communications circuits receives input from a user. In response, the software interface initiates accessing of a route plan having a first route point group associated with a first circuit end point, a second route point group associated with a second circuit end point, and one or more routes connecting the first and second route point groups. Each route is available for use in designing the circuit. The software interface also initiates selection of a route according to the route plan and automatic assignment of the selected route to the circuit in designing the circuit. The software interface provides information to the user reflecting the assignment of the route to the circuit. In one more particular embodiment, the route plan is selected from among multiple route plans according to a service application automatically derived from an associated circuit order. In another more particular embodiment, the software interface may initiate assignment of equipment to the circuit at one or more points along the selected route according to an equipment assignment template (EAT) that specifies characteristics of the equipment. The EAT may be selected from among multiple EATs according to a service application.

The present invention provides a number of important advantages over prior circuit design techniques. Unlike previous techniques, the introduction of route plans based on route point groups allows the optimal routing for a circuit to be determined automatically based on strategic plans, available capacity, diversity criteria, and other suitable factors, resulting in faster, more consistent, and more efficient designs. The present invention automates many processes performed manually in prior techniques, relieving design personnel of the burden of intimate familiarity with the network and helping network providers respond more quickly, consistently, and reliably to customer requests for circuits. For example, selection and assignment of qualified facilities may be made automatically, without regard to the physical layer technology associated with the facilities. Required equipment for a specific type of circuit may be automatically selected and assigned according to suitable equipment assignment templates.

Other aspects of the circuit design process, automated according to the present invention, benefit the network provider and its customers in a variety of ways. As an example, personnel may be transferred into and out of design positions more readily, giving the network provider increased flexibility. The present invention also allows controls to be readily placed on the design process, helping ensure that circuit designs adhere to network plans when possible and, if not possible, that design violations are logged and flagged for subsequent remediation. In contrast to previous techniques, the present invention allows network planning and other business intelligence to be readily incorporated into the circuit design process. As an example, factors such as demand, capacity, and load balancing may be considered automatically in connection with route selection and assignment to facilitate network optimization.

Systems and methods that incorporate one or more of these or other technical advantages are well suited for modern communications networks. Still other technical advantages are readily apparent to those skilled in the art from the following figures, descriptions, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an exemplary system for automatically designing circuits in a communications network;

FIG. 2 illustrates an exemplary portion of a network associated with a route plan;

FIG. 3 illustrates an exemplary route plan;

DETAILED DESCRIPTION OF THE INVENTION

Figure 4:
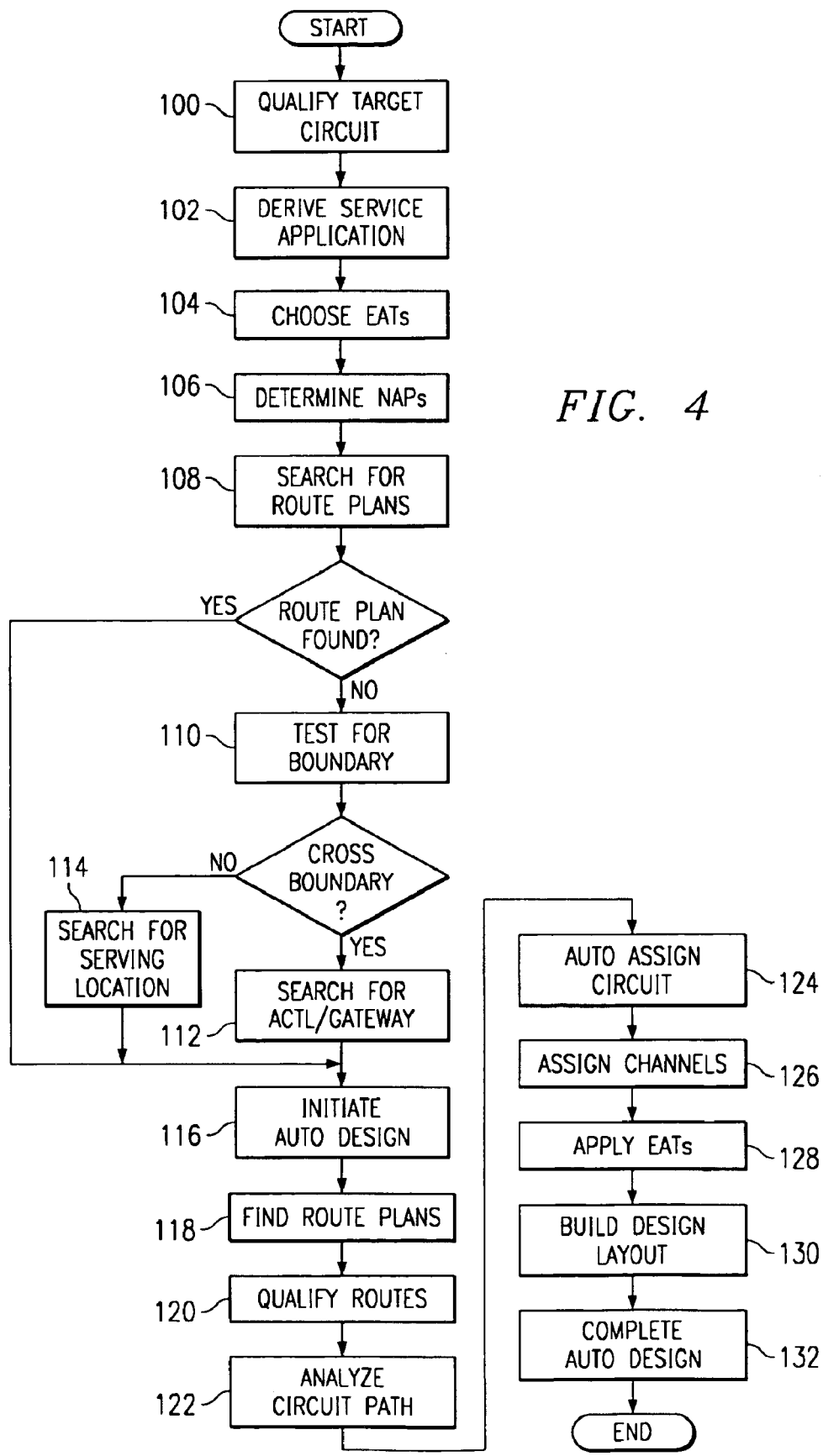
FIG. 4 illustrates an exemplary automatic circuit design process.

Communications circuits connect network locations to enable communications between these locations, possibly through one or more intermediate locations. As an example, a circuit might be a circuit that connects two end users; a trunk circuit that connects two switching systems, a Signaling System No. 7 (SS7) link that connects a Signaling Transfer Point (STP) to a Service Switching Point (SSP), to another STP, or to a Service Control Point (SCP); a "911" or other emergency services circuit; a circuit including nodes on a Synchronous Optical Network (SONET) ring; a permanent virtual circuit (PVC), virtual connection, or link relying on Frame Relay (FR), Asynchronous Transfer Mode (ATM), Internet Protocol (IP), or any other packet-based protocol; a "bandwidth" circuit incorporating a physical circuit that virtual circuits "ride" using portions of its available bandwidth; or any other suitable circuit. The present invention encompasses the automatic design of any appropriate circuits, according to particular needs.

FIG. 1 illustrates an exemplary system 10 for automatically designing a communications circuit, referred to as the target circuit. System 10 includes a design engine 12 that, in general, may use one or more service applications 14, route plans 16, equipment assignment templates (EATs) 18, and other suitable elements to design one or more circuits automatically according to the particular needs of a network provider, its customers, or any other entities. As described below, design engine 12 may use one or more service applications 14 to select suitable route plans 16 and EATs 18 for the target circuit. Design engine 12 uses one or more route plans 16 to identify available facilities that it may assign to the target circuit. Design engine 12 may also use one or more EATs 18 to assign equipment to the target circuit at terminating locations of its constituent segments. Once certain user-specified, default, or other data elements have been defined according to the particular target circuit, design engine 12 performs the operations necessary to design the target circuit substantially automatically, providing important technical advantages over manual and other prior techniques.

Design engine 12 may operate on one or more computer systems at one or more locations. Service applications 14, route plans 16, EATs 18, and any other appropriate data elements may be stored in the same or different databases at one or more locations integral to or separate from the computer systems supporting design engine 12. User 20 may include one or more computer systems, one or more persons associated with these computer systems, or both. Design engine 12 and user 20 may communicate with one another, and with databases supporting service applications 14, route plans 16, EATs 18, and other data elements, using one or more local area networks (LANs), metropolitan area networks (MANs), wide area networks (WANs), a global computer network such as the Internet, or any other suitable network or networks. Moreover, components of system 10 may be implemented using any suitable combination of hardware, firmware, software, or other technologies according to particular needs.

Service Applications

Service applications 14 may be used to select route plans 16 and EATs 18 that design engine 12 uses in the automatic design of circuits. To accomplish this, service applications 14 classify circuits, perhaps originating from different circuit orders, such that they may be automatically designed in a consistent and systematic manner. For example and not by way of limitation, a service to be provided using the target circuit may include a dedicated Internet access service and be identified on the circuit order. Corresponding service application 14 describes the intended use of the target circuit to support the service, for example, as a digital subscriber line (DSL) data circuit. As a second example, a Frame Relay (FR) user-to-network interface (UNI) service may be described by service application 14 for an Integrated Service Digital Network (ISDN) Primary Rate Interface (PRI) circuit. The present invention contemplates designing a circuit to support any requested service using any associated service application 14, as appropriate. However, although service applications 14 are typically desirable to help improve the consistency and efficiency of the design process, the intended use of the target circuit may be specified in any appropriate manner without departing from the intended scope of the present invention.

A service request represents a communication from or to a party expressing interest in an associated service item. For example, a service request may represent a request sent from a customer to a network provider or from one network provider to another. In one embodiment, a service application 14 may be deduced from and may categorize items in a network provider product catalog that have been entered on a standard access service request (ASR), on a customized product service request (PSR) formatted according to particular network provider rules, on an internal service request (ISR) generated from within the network provider, or another suitable service request. Design engine 12 may process the service request according to its type, for example, executing different process steps for a circuit ordered using a PSR than for a circuit ordered using an ASR or ISR. In addition to items from a product catalog, a service application 14 may categorize one or more service types, service type groups, network channel (NC) or network channel interface (NCI) codes (collectively, NC/NCI codes), or any other suitable information. Although service requests are described, the present invention contemplates automatically designing a target circuit in response to any form of circuit order.

In one embodiment, design engine 12 derives the service application 14 of a target circuit at the time it is automatically designing the target circuit. One or more of the following processes, in any suitable combination and without limitation, may be executed in whole or in part in connection with one or more service applications 14.

Create Service Application

This process creates a service application 14 defined using a preferably unique name, a description, or both.

Change Service Application

This process changes the name, description, or both name and description of a service application 14.

Delete Service Application

This process deletes a service application 14.

Create Service Application Link

This process creates a link between a service application 14 and one or more other entities that describe service application 14, which may include product catalog items, service types, service type groups, NC/NCI codes, or any other suitable entities. The occurrences of the various entities to which service application 14 is linked define service application 14. For example, a "voice service" item might describe both DSL voice and IP voice services. Therefore, a first service application 14 describing a DSL voice circuit and a second service application 14 describing an IP voice circuit would each be linked to the "voice service" item using service application links.

In one embodiment, during the automatic design process, design engine 12 may identify and use a service application link to derive service application 14 for an entity contained in a service request or other circuit order. In a particular embodiment, for PSRS, links may be established to product catalog items, product specification items, service types, and service type groups, singly or in any suitable combination. For ASRs and ISRs, links may be established to service types, service type groups, and NC/NCI codes, singly or in any appropriate combination. If a link to an NC/NCI code is or may become unavailable, both primary and optional secondary NC/NCI codes might be specified. Service applications 14 may linked in any suitable manner to the entities associated with circuit orders.

Define Link Preference

In one embodiment, the user 20 may define one or more priorities that design engine 12 may use to select service application 14 for a service application link. For example, for the "voice service" item described above, there might be two associated service applications 14—"DSL voice circuit" and "IP voice circuit"—available for use. If the first "DSL voice circuit" service application 14 was preferred for any reason over the second "IP voice circuit" service application 14, then user 20 might assign the first a preference of "1" and the second a preference of "2" as appropriate.

Change Link Preference

This process changes the preference for a service application 14.

Delete Service Application Link

This process deletes a service application link to a service item, service type, service type group, NC/NCI code, or other entity that defines a service application 14. In one embodiment, user 20 is not permitted to delete a link if a circuit whose service application 14 was derived using the link has been automatically designed.

Assign Service Application Capability

This process associates with a service application 14 a capability defining the features, service options, or other capabilities that a facility must have before it may be assigned to a particular target circuit. For example, if a target circuit must be assigned a facility that can support adaptive differential pulse code modulation (ADPCM), any facility that supports this design requirement should have a capability identified as "ADPCM."

Delete Service Application Capability

This process deletes a capability associated with a service application 14.

Derive Service Application

This process derives a service application 14 from a service request (or other circuit order). The first step is to determine the type of service request involved, for example, according to a document number associated with the service request or in another suitable manner.

In one embodiment, once it is determined that the service request is a PSR, derivation of the service application 14 proceeds as follows: (1) using the relationship between the target circuit and a service type that is specified in the PSR, determine whether a service application link exists for the service type; (2) if no link exists for a service type, determine whether any link exists for a service type group containing the service type; (3) if no link exists for a service type group, determine whether any link exists for a product catalog item relating to the target circuit; (4) if no link exists for a product catalog item, determine whether a link exists for a product specification item that is a parent of the product catalog item; (5) once a link is found, do not continue to the next step; and (6) if no link can be found, then the user 20 may need to specify one or more service applications 14 for the target circuit before design engine 12 can continue.

If it is determined that the service request is an ASR or ISR, derivation of the service application 14 may proceed as follows: (1) determine NC/NCI codes for the circuit; (2) if there is only one (primary) NC/NCI code, determine whether there is a service application link for the NC/NCI code; (3) if there is also a secondary NC/NCI code, determine whether there are links for both the primary and secondary NC/NCI codes; (4) if no NC/NCI code links are found, determine whether there is a link for the NC code (typically a composite of a network channel service code (positions 1–2) and network channel option code (positions 3–4)); (5) if no NC code link was found, then determine whether there is a link for a service type related to the network channel service code; (6) if no link exists for such a service type, determine if a link exists for a service type group containing the service type; (7) once a link is found, do not continue to the next step; and (8) if no link can be found, then the user 20 may need to specify one or more service applications 14 for the target circuit before design engine 12 can continue with the automatic design process.

Although determining service application 14 for the target circuit using design engine 12 is preferable, the target circuit may be designed without regard to how this information is obtained. For example, as discussed above, user 20 might provide this information either by choice or by necessity. Furthermore, since the present invention does not require that service applications 14 be used, design engine 12 may design the target circuit automatically even without this information.

Route Plans

FIG. 2 illustrates an exemplary route plan 16 specifying one or more routes 32 that an exemplary target circuit may take between two end points 34. In general, a route plan 16 provides a way to organize the possibly multiple alternative routes 32 a target circuit may be assigned during the automatic design process. The use of route plans 16 may be particularly helpful with respect to higher-traffic areas of a network, where capacity planning is often essential. As an example, a route plan 16 might be particularly appropriate in designing circuits to connect two major metropolitan areas such as Los Angeles and New York. Each route 32 within a route plan 20 may pass through one or more intermediate points 36 between end points 34. For example, as illustrated in FIG. 2, first route 32a might pass through a single intermediate point 36 while second route 32b might pass through two intermediate points 36. Although intermediate points 36 should generally be limited in number, the best route 32 for a target circuit may not be the one with the fewest intermediate points 36.

In one embodiment, the route plan 16 assumes the existence of the underlying facilities necessary to provide connectivity along its constituent routes 32, but does not rely on those facilities being specified in any particular manner. In the context of the route plan 16, the facilities are simply viewed as connections between various points along routes 32. As a result, during the automatic design process, design engine 12 is able to select a route 32 for assignment to the target circuit without regard to certain characteristics of the underlying facilities. Suppose for example that design engine 12 is designing a target circuit to support the "voice service" item discussed above. In one embodiment, design engine 12 may assign a route 32 to the target circuit whether the facility is based on asynchronous physical layer technology such as T3 or T1, on synchronous physical layer technology such as a SONET facility, or on other physical layer technology. Although in one embodiment design engine 12 may select route 32 totally independent of the characteristics of underlying facilities, design engine 12 may consider one or more facility characteristics in selecting a route 32 without departing from the scope of the present invention.

In one embodiment, each point in the route 32, whether an end point 34 or an intermediate point 36, has an associated route point group 38 containing one or more network locations 40 that are viewed as equivalent from a routing perspective. Route point groups 38 allow design engine 12 to control the routing of circuits between the various route point groups 38 without considering routing, facility assignment, or other constraints associated with network locations 40 within the route point groups 38. For example, a route point group 38 for an interexchange carrier (IXC) may be defined to include all its points-of-presence (POPs) that serve a particular region. In contrast, for a local exchange carrier (LEC), a route point group 38 might be defined to include the switching systems within a particular central office (CO) lying within the larger route point group 38 of the IXC. In designing a circuit for the IXC, design engine 12 would not need visibility into routes, facilities, and other features within its route point group 38. Such constraints would only become relevant if design engine 12 was designing a circuit for the LEC operating within the IXC's route point group 38. Therefore, route point groups 38 depend on the frame of reference from which design engine 12 must approach the problem of designing target circuits.

Each route 32 may include one or more segments 42, each of which is a "one hop" connection between adjacent route point groups 38 along route 32. Although any appropriate number of intermediate points 36 (and thus segments 42) may be used, all routes 32 in the route plan 16 must connect to the specified end points 34 for the route plan 16. In one embodiment, where the traffic flow between route point groups 38 is assumed to be bi-directional, the sequencing of route point groups 38 that define route 32 or a particular segment 42 within route 32 is inconsequential. The routes 32 in the route plan 16 may be selected during the automatic design process according to their priority, which might be based on the total cost of a route 32 or cost of one or more segments 42 in the route 32, total mileage of the route 32 or mileage of one or more segments 42, ownership of the route 32 or of one or more segments 42, a transmission rate associated with the route 32 or with one or more segments 42, or any other suitable criteria, in any suitable combination.

Exemplary route plan 16 illustrated in FIG. 2 may be expressed in table format as shown in FIG. 3. The illustrated table identifies routes 32a and 32b, end points 34 for each route 32 (which are the same for both routes 32), intermediate points 36 for each route 32 (one or more of which may be but in this case are not identical for both routes 32), a priority 44 for each route 32, and an effective date range 46 for each route 32. As shown, end points 34 and intermediate points 36 may be identified using their corresponding route point groups 38. In one embodiment, a user 20 need only specify two end points 34 (or the corresponding route point groups 38) to define route plan 16. The present invention contemplates other suitable information for route plan 16, beyond the user-specified route point groups 38 or other user-specified information, according to any appropriate rules.

In one embodiment, rather than user 20 specifying the route point groups 38, design engine 12 may derive the route point groups 38 from existing defined network areas. Suppose for example that a particular long distance service provider deals with three network locations 40 "DLLSTXXA," "DLLSTXXB," and "DLLSTXXC" in the Dallas area Suppose also that the service provider wants to route traffic between each of the network locations 40 in a similar manner. In this case, the network locations 40 might logically belong in one route point group 38 and route point group 38 might be derived from the existing network area containing these network locations 40. The present invention contemplates deriving route point groups 38 based on any existing entity or information, according to particular needs.

Design engine 12 may execute one or more of the following processes in whole or in part, in any combination and without limitation, in connection with one or more route plans 16.

Define Route Plan

This process defines route plans 16. In one embodiment, to define a route plan 16, user 20 must define its constituent routes 32 and any suitable components of these routes 32. Each route plan 16 is preferably given a unique name and may not duplicate any other route plan 16. Route plan 16 may be considered a duplicate if another route plan 16 already exists with the same end points 34 (regardless of their sequencing), the same rate code defining its transmission rate, the same service applications 14, and overlapping effective date ranges 46. In some cases, a bit rate may be used instead of a transmission rate for suitable bandwidth applications. Other definitions of a duplicate route plan 16, or even the ability to have duplicate route plans 16, may be provided. This process may encompass, in whole or in part, one or more of the following sub-processes, in any appropriate combination and without limitation.

Define End Points

This sub-process allows end points 34 to be defined for route plan 16, in terms of route point groups 38. In one embodiment, any route point group 38 is eligible for selection as an end point 34 for a route plan 16. However, the design engine 12 may validate that both end points 34 are not associated with the same route point group 38. Typically, user 20 will be responsible for defining end points 34, although as described above this may not necessarily be the case.

Establish Effective Date Range

This process allows "From" and "To" effective dates to be defined to establish effective date range 46. Design engine 12 may use the effective date range 46 to select route plans 16 during the automatic design process. In a particular embodiment, the "From" effective date must be specified in order to have a valid route plan 16, but the "To" effective date is not required, such that route plan 16 may be in effect essentially indefinitely. Typically, user 20 is responsible for defining effective date range 46, but as described above this may not necessarily be the case.

Define Routes

This sub-process creates routes 32 (in the context of route plan 16) built on one or more contiguous segments 42. In one embodiment, to define route 32, at least one segment 42 must be defined for route 32, the originating and terminating points (route point groups 38) for each segment 42 must be specified, and component segments 42 must form a contiguous connection between the two end points 34 (route point groups 38) of the route plan 16. Fewer or additional requirements may be enforced without departing from the intended scope of the present invention.

User 20 may optionally define the cost associated with communicating traffic over one or more individual segments 42 in route 32 or for the route 32 in its entirety. The total cost of route 32 may be determined and made available to user 20 according to the costs of component segments 42. Costs may be expressed in one or more suitable currencies (such as U.S. Dollars) according to particular needs. Design engine 12 may use the costs of routes 32 or component segments 42 in selecting between alternative routes 32 for assignment to the target circuit. Alternatively, the costs may be intended for informational purposes only.

User 20 may optionally define the distance that one or more segments 42 span, in miles, kilometers, or any other unit of distance. The total distance for a route 32 may be determined and made available to the user 20 according to the distances of component segments 42. Design engine 12 may use the distances of routes 32 or component segments 42 in selecting between alternative routes 32 for assignment to the target circuit. Alternatively, distances may be intended for informational purposes only.

Within route plan 16 there will typically be multiple routes 32 from which the design engine 12 may select in designing the target circuit. Where this is the case, each route 32 in the route plan 16 will preferably have an associated user-specified or other priority 44 that design engine 12 may use in selecting between the alternative routes 32. For example, referring again to the table of FIG. 3, there may be two routes 32 for exemplary route plan 16 connecting Los Angeles (route point group 38a) to New York (route point group 38c). If the network provider wanted to direct as much traffic as possible through intermediate point 36 along first route 32a, then user 20 might assign first route 32a a priority 44 of "1" and second route 32b a priority 44 of "2." When designing a target circuit between Los Angeles and New York according to this route plan 16, design engine 12 would select route 32a according to its priority 44. In one embodiment, as in this example, design engine 12 evaluates routes 32 within route plan 16 in ascending order of priority 44 (i.e. beginning with "1") in attempting to select a route 32 for assignment to the target circuit.

In one embodiment, two or more routes 32 within a route plan 16 may have identical priorities 44. For example, if the network provider has two routes 32 between Los Angeles and New York that are equally suitable from an overall network planning perspective, user 20 may specify the priorities 44 of both routes 32 as "1." If multiple routes 32 are assigned the same priority 44, the design engine 12 may consider a route allocation percentage in selecting a single route 32 for assignment to the target circuit, as described more fully below. When a new route 32 is added to a route plan 16, its priority 44 may initially default to the next highest priority 44 in route plan 16. For example, if two existing routes 32 in route plan 16 have priorities 44 of "1" and "2," a next route 32 added to route plan 20 may be initially assigned a priority 44 of "3" as a default value. Similarly, if both existing routes 32 have priorities 44 of "1," the added route 32 may be initially assigned a default priority 44 of "2." The user 20 is able to change the defaulted priority 44 of the added route 32 as appropriate.

As discussed above, each route 32 within route plan 16 may have an allocation percentage. If route plan 16 has multiple routes 32 with the same priority 44, design engine 12 may use the allocation percentage to select from among the competing equal priority routes 32 for assignment to the target circuit. Again using the exemplary route plan 16 having two routes 32 between Los Angeles and New York, if both routes had priorities 44 of "1" and the network provider wanted circuit assignments to be exactly balanced between routes 32, the allocation percentage might be set to "50%" for both routes 32. However, if first route 32a has a "75%" allocation percentage, second route 32b has a "25%" allocation percentage, and an order for four circuits is received, then three circuits may be assigned first route 32a and one circuit may be assigned second route 32b. If two or more routes 32 have equal priority 44, the allocation percentages should preferably total 100%. Analogous to the default priority 44 described above, allocation percentages may default to 100% for routes 32 added to route plan 16, with user 20 being able to change the default values as appropriate.

In one embodiment, user 20 may designate any route 32 as a disaster recovery route 32. Although typically for informational purposes only, design engine 12 might rely on this designation, for example, in attempting to assign an alternative route 32 to a circuit in response to failure of an existing route 32 or component thereof.

In defining a route 32, user 20 may be able to designate the route 32 as a mis-route if the route 32 fails to comply with the associated route plan 16 in one or more respects. If design engine 12 uses the particular route plan 16 in the automatic design process, and one or more constituent routes 32 are flagged as mis-routes, then design engine 12 may identify and flag the resulting circuit as a candidate for re-design. For example, suppose that route 32 with priority 44 of "3" is chosen because no capacity exists on routes 32 with priorities 44 of "1" and "2." According to an appropriate mis-route indicator, target circuits designed using the route 32 with preference "3" may be readily identified as re-design candidates. Intentional mis-routes might also be made, for example, according to diversity rules or in response to specific customer requests. A change to a mis-route indicator may have an impact on logged design violations. For example, if the mis-route indicator is de-selected, any related logged design violations may be deleted. Conversely, if user 20 flags route 32 as a mis-route, design violations may be logged for any circuits designed using route 32.

In one embodiment, the identification and logging of re-design candidates may play an important role in network optimization. In addition to intentional mis-routes described above, a designed circuit may become a re-design candidate in response to changes to its route 32, the corresponding route plan 16, one or more circuit elements assigned to the circuit, or another aspect of the network that may affect the circuit. For example, previously leased facilities assigned to the circuit may become owned, thus making redesign desirable. Equipment assigned to the circuit may become obsolete technologically or based on a business arrangement between the network provider and a particular vendor, requiring a new equipment assignment. The volume and type of traffic associated with the circuit or with other circuits may change, making re-design desirable for increased throughput, better load balancing, or other goals. The present invention contemplates identifying a circuit as a re-design candidate for any suitable reason and at any time during the automatic design process or afterward. User 20 may select re-design candidates to initiate their automatic re-design in response to specific activity, according to a schedule (as part of routine circuit grooming or otherwise), or on any other basis, according to particular needs.

Associate Route Plan with Service Application

As described above, service applications 14 provide a way to categorize target circuits such that they may be automatically designed in a consistent and systematic manner. This process describes the association between route plan 16 and one or more service applications 14. However, route plan 16 need not necessarily be associated with a service application 14. For example, a lack of such an association might be desirable in cases where the network provider wants to route traffic through some portion of its network regardless of the service being provided. When a service application 14 is disassociated from a route plan 16, circuits that previously used service application 14 and the associated route plan 16 may be flagged with a "Route Plan Changed" design violation, since the route plan 16 used may no longer be appropriate.

Associate Route Plan with Rate

Similar to service applications 14, a route plan 16 may, but need not necessarily be, associated with a transmission rate according to a corresponding rate code. In one embodiment, the rate code for route plan 16 identifies the bit rate for any target circuit to be designed using route plan 16. For example only and not by way of limitation, the rate code for exemplary route plan 16 may correspond to an OC48 transmission rate. When a rate code is disassociated from route plan 16, circuits that previously used the rate code and the associated route plan 16 may be flagged with "Route Plan Changed" design violations, since the route plan 16 may no longer be appropriate.

Enable Route Plan

This process allows user 20 to enable a route plan 16, thereby making it eligible for selection and assignment to a target circuit.

Disable Route Plan

This process allows user 20 to disable a route plan 16, making it ineligible for selection and assignment to a target circuit. In one embodiment, route plan 16 may be disabled at any time and for any reason. For example, by disabling route plan 16, user 20 may take the route plan 16 out of circulation long enough to make any necessary changes, without needing to artificially manipulate its effective date range 46. In the alternative, this process can also be used to indefinitely decommission a route plan 16 such that it may never again be available for use.

Copy Route Plan

This process creates a new route plan 16 from an existing route plan 16. Some or all data elements for the existing route plan 16 are copied to the new route plan 16. User 20 may then need to change one or more of these copied data elements to avoid creating a duplicate route plan 16.

Delete Route Plan

This process deletes route plan 16 from storage. In one embodiment, only route plans 16 that have not been selected for assignment to a target circuit may be deleted. Deleting a route plan 16 causes its subordinate routes 32, segments 42, and any other constituent components to be similarly deleted.

Change Route Plans

This process manages changes to route plans 16 after they have been created. Such changes may include changes to the name, description, routes 32, end points 34 (route point groups 38), intermediate points 36 (route point groups 38), segments 42, priorities 44, allocation percentages, disaster recovery indicators, mis-route indicators, effective date range 46, or any other suitable data elements. Target circuits that were designed using the affected route plan 16 will be flagged with "Route Plan Changed" design violations. This is because changes to these data elements may make use of the route plan 16, or the original selection (or rejection) of a particular route 32, no longer appropriate.

Equipment Assignment Templates

Equipment specifications identify the properties and functionality of a piece of hardware or other equipment. In one embodiment, equipment specifications should be limited to equipment potentially relevant to the operation of a target circuit, such as channel banks, channel units, switches, routers, bays, racks, shelves, cards, and other appropriate circuit-related equipment. Each piece of equipment that is available for assignment to a target circuit may be selected for assignment based on its type (e.g., Brand X Model Y IP router) or, more broadly, based on properties and functionality described in an associated equipment specification. If assigned equipment is moved, rearranged, or modified, or if the associated equipment specification is modified, all affected circuit designs should be re-evaluated accordingly. Equipment specifications may be used to build EATs 18 that design engine 12 may use to automatically identify installed equipment at network locations 40 for assignment to the target circuit. The present invention contemplates the design engine 12 making equipment assignments based on EATs 18 or on any other suitable basis.

EATs 18 are collections of equipment types and equipment specifications that provide reusable definitions of equipment that may be assigned to target circuits during the automatic design process. For example, assume a network provider needs to design a target circuit to support a dedicated Internet access service. During design of the circuit, it may be necessary to assign an IP router at an Internet service provider (ISP) hub serving as the terminating network location 40 for the target circuit. In this case, it may be desirable to define an EAT 18 that includes an IP router, either generally based on an equipment type or more particularly according to an equipment specification. One or more EATs 18 may be associated with service application 14 or with the rate of the target circuit.

Design engine 12 may execute one or more of the following processes in whole or in part, in any suitable combination and without limitation, in connection with one or more EATs 18.

Define EAT

This process builds EATs 18. User 20 preferably specifies a unique name, a description, or both for an EAT 18. This process may encompass one or more of the following sub-processes, in any suitable combination and without limitation.

Associate Equipment Type with EAT

This sub-process associates an equipment type with an EAT 18, providing for cases in which any brand and model of a particular type of equipment will suffice in designing a target circuit. For example, suppose a generic jack is needed to design a target circuit for a certain service application 14. Suppose also that several equipment specifications for inventoried jacks could be used to provision this particular type of target circuit. In this case, it might be sufficient to associate a "Jack" equipment type with an EAT 18 (rather than individually associating with the EAT 18 an equipment specification for each of the inventoried jacks).

Disassociate Equipment Type from EAT

This sub-process disassociates an equipment type from an EAT 18. There are preferably no restrictions on the execution of this process, such that an equipment type may be disassociated from an EAT 18 at any time and under any conditions, although conditions may be imposed on the ability to disassociate if appropriate.

Associate Equipment Specification with EAT

This sub-process associates an equipment specification with an EAT 18. This provides for situations in which only a piece of equipment satisfying specified criteria should be used in designing a target circuit. For example, assume a network provider exclusively uses Brand X Model Y IP routers in its network. In this case, it may be appropriate for user 20 to associate an equipment specification for a Brand X Model Y IP router with an EAT 18. Similarly, association of the equipment specification might be appropriate where the equipment specification has certain capabilities required by the target circuit and not all equipment specifications for that equipment type have those capabilities.

Disassociate Equipment Specification from EAT

This sub-process disassociates an equipment specification from an EAT 18. There will preferably be no restrictions on the execution of this process, such that an equipment specification may be disassociated from an EAT 18 at any time under any conditions, although conditions may be imposed if appropriate.

Specify Equipment Options for EAT

Equipment manufacturers may define one or more hardware, software, or other options for pieces of equipment or equipment types. These options will preferably be available when defining an EAT 18. This sub-process allows user 20 to specify in the EAT 18 one or more equipment options needed to design a target circuit. Equipment options specified on the EAT 18 must preferably be available on an installed piece of equipment before design engine 12 is able to query for and assign that equipment to a target circuit. Equipment options may wholly or partially overlap the criteria specified in one or more equipment specifications.

Define Distance Threshold for Equipment Type

In some instances, it may be desirable to assign equipment conditionally based on the distance a segment 42 spans within an assigned route 32. A classic example involves the use of echo cancellers to improve sound quality for long-distance voice circuits. This sub-process allows the user 20 to specify a distance threshold for each equipment type in an EAT 18. Taking the echo canceller as an example, the network provider may have a policy requiring one or more echo cancellers for certain types of circuit if the distance for a segment 42 exceeds n miles or any other suitable unit of measure. Accordingly, this distance threshold would be set to n miles. The distance threshold may similarly specify a maximum distance threshold, below which a certain equipment type is required.

Define Distance Threshold for Equipment Specification

As for equipment types, distance thresholds may be specified for one or more equipment specifications in an EAT 18. The same idea applies—that is, to define a threshold distance beyond which or below which a certain equipment specification is required. This sub-process allows the user 20 to define this threshold for each of the equipment specifications in an EAT 18.

Associate EAT with Service Application

An EAT 18 may optionally be associated with a service application 14. This process builds that association. As described above, a service applications 14 may be used to categorize a circuit. When designing a target circuit, the design engine 12 may use service application 14 to search for one or more associated EATs 18. For example, it may be desirable to associate an EAT 18 including an IP router equipment type with a service application 14 for dedicated Internet access service.

Disassociate EAT from Service Application

This process disassociates an EAT 14 from a service application 14. There are preferably no restrictions on the execution of this process, such that an EAT 18 and an associated service application 14 may be disassociated at any time and for any reason. However, one or more conditions may be imposed if appropriate.

Specify Rate for EAT

An EAT 18 may optionally be associated with a transmission or bit rate, through a suitable rate code or otherwise. This process builds such an association. For example, an EAT 18 might be defined to support circuits with OC48 transmission rates.

Activate EAT

This process makes an EAT 18 eligible for use by design engine 12. In one embodiment, only an EAT 18 that has been activated may be evaluated when design engine 12 is designing a target circuit.

Deactivate EAT

This process makes an EAT 18 ineligible for use. Design engine 12 does not evaluate deactivated EATs 18.

Delete EAT

This process permanently deletes an EAT 18. In one embodiment, an EAT 18 may be deleted only if it has not already been used to design a target circuit. There are preferably no other restrictions on deleting an EAT 18.

Copy EAT

This process creates a new EAT 18 from an existing EAT 18, copying some or all data elements for the existing EAT 18 to the new EAT 18. User 20 is preferably required to change the name before saving the new EAT 18 to avoid confusion.

Automatic Design

FIG. 4 illustrates an exemplary process for automatically designing one or more communications circuits, referred to herein as the automatic design process or "Auto Design Circuit" process. It is assumed for purposes of this description that all facilities, equipment, network locations 40, and other key circuit elements have been previously defined. In addition, the route plans 16 that will ultimately drive the design should accurately reflect the network. For example, if the route plan 16 indicates that there is connectivity between end points 34, design engine 12 may query for facilities between the associated route point groups 38 even if in reality no facilities have been defined between these route point groups 38.

In general, user 20 first selects a circuit to be automatically designed. Once a target circuit is selected, design engine 12 begins executing the "Auto Design Circuit" process. If the pre-processing steps are executed successfully, an Auto Design window may be displayed containing default values for service application 14, EATs 18, or any other suitable data elements. Design engine 12 may then select and assign a route 32, equipment, and any other circuit elements to the target circuit in the manner described below. If the automatic design process is unable to complete successfully, user 20 may be presented with a standard graphical circuit design (GCD) or other suitable window allowing user 20 to manually or otherwise design the target circuit. In addition, for further reliability, automatically generated designs may be manually reviewed before being provisioned. Although the automatic design process is described primarily with respect to design of a single target circuit, the present invention contemplates design engine 12 automatically designing multiple target circuits serially, simultaneously (its operations being interleaved in any suitable manner), or otherwise.

Design engine 12 executes the automatic design process. One or more of the following processes, in any appropriate combination and without limitation, may play roles in that process. Furthermore, processes may be executed in whole or in part, and in any suitable order, according to particular needs.

Qualify Target Circuit (Step 100)

This process qualifies the target circuit, including validating the circuit against one or more exception conditions. Continuation of the automatic design process will preferably depend on successful completion of this qualification process. If the target circuit fails one or more validations, it may need to be manually designed unless the conditions responsible for the failure are remedied in some appropriate manner. For example, a Connecting Facility Assignment (CFA), which may be integral to design of the circuit, may be in effect but the circuit order may not capture the actual CFA value, instead merely indicating that the customer specified a CFA. The circuit order may specify an intermediate CFA (ICFA), which in one embodiment is not compatible with the use of route plans 16 to govern the automatic design process (recall that route plans 16 may be defined solely according to end points 34). The target circuit might be a protected circuit requiring special processing or user intervention that does not comply with some aspect of the automatic design model. End points 34 for the target circuit might be the same (although the user 20 may be permitted to change either or both end points 34 to rectify this condition). These or any other conditions deemed sufficient to terminate the automatic design process may be validated against to qualify the target circuit, according to particular needs.

Derive Service Application (Step 102)

As described above, a service application 14 of a target circuit may be used to help find suitable route plans 16 and EATs 18 for the circuit. This process derives one or more service applications 14 for the target circuit from related PSR, ASR, ISR, or other service requests, as described more fully above. Once it has been derived, the service application 14 may be passed downstream to related processes.

Choose EATs (Step 104)

This process finds one or more EATs 18 to be used later on in the automatic design process. In one embodiment, retrieval of EATs 18 is based upon the service application 14 and the rate code of the target circuit. This process may depend on the "Derive Service Application" process to provide a service application 14 with which design engine 12 may query for EATs 18.

Determine NAPs (Step 106

Figure 5:
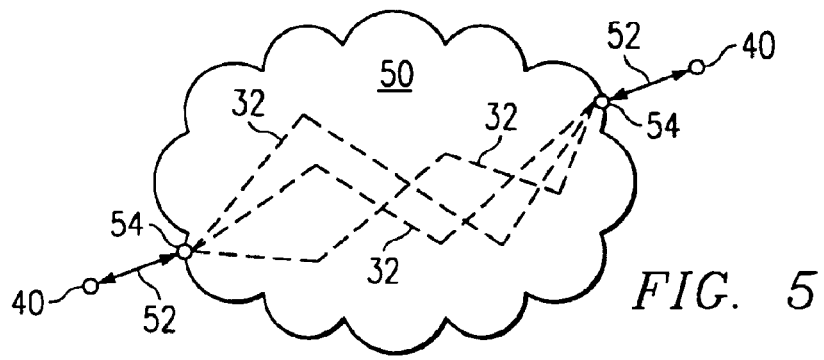
FIG. 5 illustrates an exemplary network containing network access points (NAPs)

When designing a circuit, it is generally necessary to consider how traffic will be routed within the network and, from a routing perspective, where the circuit actually begins and ends (possibly outside the network). As described above, route plans 16 govern the flow of traffic within the network according to the present invention. This process addresses the second of these issues, evaluating the target circuit, the service request or other circuit order, and one or more CFAs (if provided) to identify network locations 40 between which to route the target circuit. As illustrated in FIG. 5, if either or both network locations 40 are outside an exemplary network 50 of a network provider, design engine 12 must look outside this network 50 to determine how these network locations 40 connect into network 50 through associated access links 52 and network access points (NAPs) 54. In general, a NAP 54 is a network location 40 within network 50 that has connectivity with one or more network locations 40 outside network 50.

In one embodiment, design engine 12 determines NAPs 54 using an algorithm that attempts to match a location identifier for the target circuit with the same or a logically related identifier that exists in a route plan 16. NAPs 54 need not have any special designation as such. That is, user 20 need not define network location 40 as a NAP 54, as might be required with an Access Customer Terminal Location (ACTL). Furthermore, a NAP 54 need not be a particular type of network location 40. NAP 54 may be an ACTL, a local servicing office (LSO) or other serving wire center (SWC), an end user location, or any other appropriate network location 40. Thus, at least in one embodiment, NAPs 54 are derived rather than defined outright.

Figure 6:
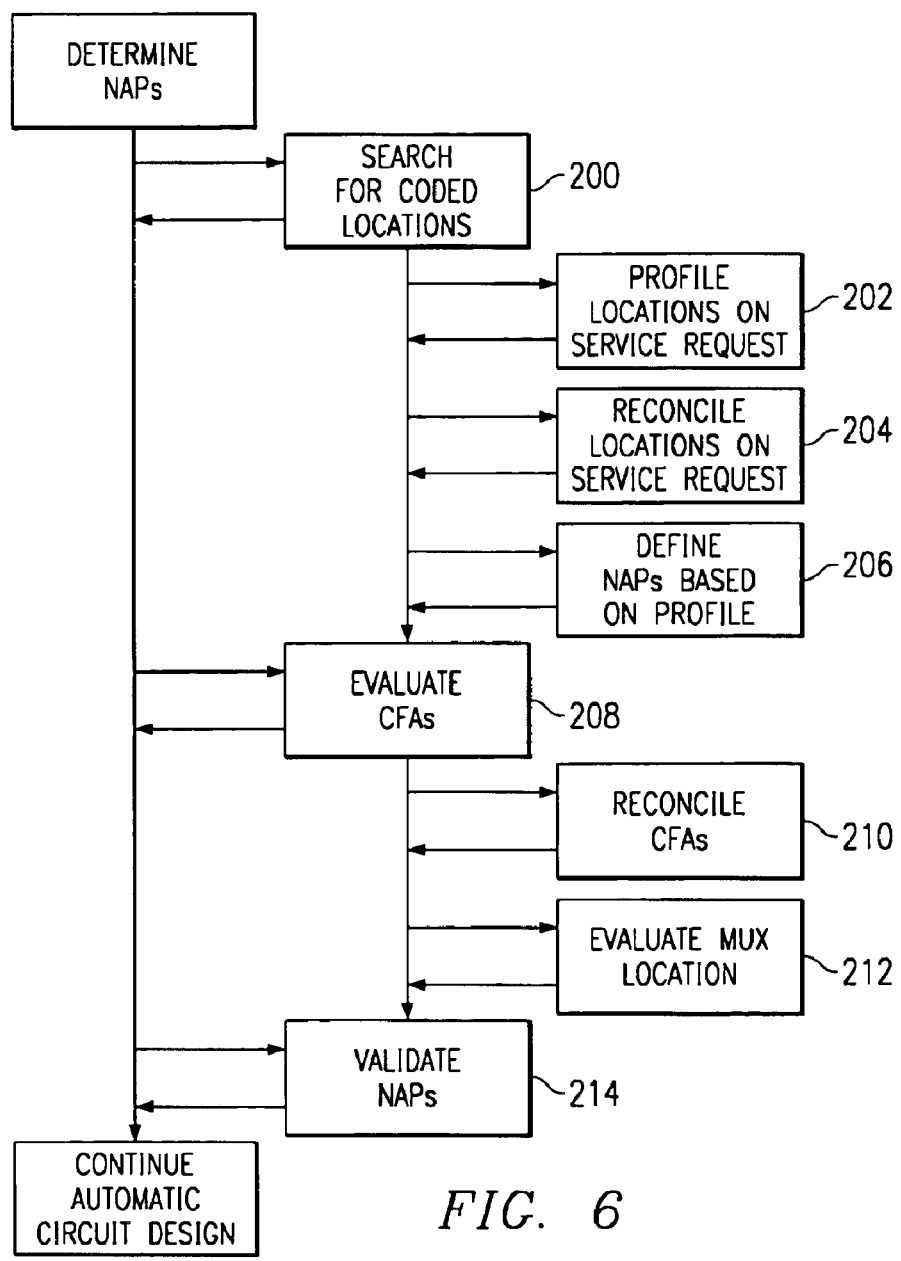
FIG. 6 illustrates exemplary process for determining NAPs.

FIG. 6 illustrates an exemplary process for determining NAPs 54 for the target circuit. This process is invoked from the "Auto Design Circuit" process being described with reference to FIG. 4. This high-level process may encompass, in whole or in part, one or more of the following subordinate processes, in any suitable combination and without limitation. This process may determine up to two NAPs 54 serially, simultaneously, or in any other suitable manner. Of course, if fewer NAPs 54 are required because one or both end points 34 of the target circuit do not lie outside network 50, then design engine 12 may execute this process only once or may skip the process entirely.

Search for Coded Locations (Step 200)

In one embodiment, to automatically design a circuit, NAPs 54 for the circuit must first be found. Moreover, in one embodiment, NAPs 54 must either be or must resolve to coded locations. This process queries for coded locations that directly or indirectly identify end points 34 of the target circuit. This process may encompass, in whole or in part, one or more of the following sub-processes, in any suitable combination and without limitation.

Profile Locations on Service Request (Step 202)

For a given network location 40 on a circuit, this sub-process generates a profile of the network location 40 and its surrounding network locations 40. If the network location 40 in question has a coded location name, then network location 40 is saved as part of the profile. If network location 40 is an end user location 40, but is not coded, then design engine 12 may perform an address match to attempt to derive a coded location name. If the address match is successful, the resulting coded location is also saved as part of the profile. If the address match returns multiple coded locations, then the automatic design process may terminate since design engine 12 may not be able to determine which of the coded locations to use as the correct NAP 54. Alternatively, design engine 12 may simply select one of the coded locations and add it to the profile. If the network location 40 is an end user location, additional information may also be added to the profile, such as the LSO, CO Exchange Area (COEA), or SWC of the end user. As an example, the SWC of the end user may generally be determined using the NPA/NXX of the end user's access telephone number. In one embodiment, a homing plan may be used to determine the LSO, COEA, or other SWC closest to the end user. One or more coded locations or other information in the generated profile may be used in subsequent processing.

Reconcile Locations on Service Request (Step 204)

This sub-process compares coded locations defined in the "Profile Locations on Service Request" sub-process with one or more network locations 40 for the target circuit, until either a match is found or the profile is exhausted. If the reconciliation process fails, the automatic design process may terminate, preferably indicating to user 20 that the network locations 40 on the target circuit could not be reconciled to coded locations on the service request or other circuit order.

Define NAPs Based on Profile (Step 206)

This process evaluates the profiled coded locations for use as NAP 54s until acceptable coded locations are found or the profile is exhausted. When an acceptable coded location is found, the design engine 12 uses it as NAP 54 corresponding to the associated network location 40. In one embodiment, profiled coded locations may be evaluated in the following order, although coded locations may be evaluated in any appropriate order according to particular needs: (1) a primary coded location (if both primary and secondary coded locations exist), (2) a secondary coded location (if both primary and secondary coded locations exist), (3) an end user coded location (derived from the address match), (4) the LSO of the end user, (5) the COEA of the end user, (6) the SWC of the end user, and (7) any other appropriate coded location. If a network location 40 that serves as a NAP 54 for one or more circuits is removed from its route point group 38, then design engine 12 may generate design violations to identify each such circuit as a candidate for re-design or at least re-evaluation.

Evaluate CFAs (Step 208)

This process retrieves the CFA and secondary CFA (SCFA) from the service request or other circuit order, if any are specified, and evaluates the CFAs for use as NAPs 54. If a valid CFA, SCFA, or both are provided, this process may revise a NAP 54 defined in the "Define NAPs Based on Profile" process to be the CFA or the SCFA. This process may encompass, in whole or in part, one or more of the following sub-processes, in any suitable combination and without limitation. If no CFA or SCFA is provided on the circuit order, then this process may be omitted.

Reconcile CFAs (Step 210)

This sub-process compares the transmission rate of the target circuit with the transmission rates for the facilities underlying the CFA and/or SCFA according to their associated rate codes. In one embodiment, if the rate codes of the CFA and SCFA are both incompatible with the rate code of the target circuit, the automatic design process may terminate and the target circuit may need to be manually designed. When the rate code of the target circuit is compatible with the rate code of either the CFA or SCFA individually (but not both), then the compatible CFA or SCFA will be used in designing the target circuit. The incompatible CFA or SCFA will not be used. If the rate code of the target circuit and the rates codes for both the CFA and SCFA are the same, and thus both the CFA and SCFA are compatible, then design engine 12 may use both the CFA and SCFA in designing the target circuit.

If one or more CFAs pass this initial validation, design engine 12 may execute two additional validations. First, if the facilities underlying the CFAs are in "Pending Disconnect," "Disconnected," or "Canceled" status, the target circuit may need to be manually designed since this may indicate that the CFA and/or SCFA provided on the circuit order is incorrect. In general, design engine 12 attempts to redeem appropriate reservations (used to secure facility, equipment, or other inventory for future use) in designing the target circuit. As a second validation, if no "Reserved" or "Unassigned" channels exist consistent with the CFA and/or SCFA or with the reservation identifier, the target circuit may need to be manually designed.

Evaluate Multiplexing Location (Step 212)

This sub-process relies on the "Reconcile CFAS" process to validate the CFA and/or SCFA. This sub-process evaluates one or more multiplexing locations that may be specifically associated with the CFA and/or SCFA. In one embodiment, if the multiplexing location is not defined as a network location 40 or does not exist in any route point group 38, then the automatic design process may terminate and the target circuit may need to be manually designed. Since a multiplexing location (usually by definition) is an extension of network 50 and is thus a natural NAP 54, inventoried multiplexing locations should preferably be included within route point groups 38 for potential use as NAPs 54. In some cases, a facility underlying the CFA or SCFA may represent the entire design of the target circuit. In this situation, this process may recognize that fact, skip forward, and make a straightforward assignment to the target circuit of a particular route 32 according to the CFA or SCFA. Otherwise, the design engine 12 will designate the validated multiplexing location as the revised NAP 54. Design engine 12 may execute this process for a validated CFA and a validated SCFA serially, simultaneously, or in any other suitable manner.

Although NAPs 54 are described, the present invention contemplates deriving suitable network access templates (NATs) to replace or combine with NAPs 54 in the automatic design process. In one embodiment, a NAT provides a mechanism for the network provider to explicitly define how elements outside of network 50 may access network 50, without requiring design engine 12 to execute "Determine NAPs" process. For example, NATs might be defined according to service applications 14 and regional markets. More specifically, the network provider might define a NAT to support an "Inter-LATA Private Line" service application 14 for the "Los Angeles" market. The NAT would identify the particular network elements design engine 12 must search for in determining how to provide network access for a "Private Line" target circuit that terminates in "New York" (which lies in a different LATA). In contrast to NAPs 54, NATs are user-specified and specific to target circuits satisfying specified criteria. As such, one or more NATs may be used to focus the search for NAPs 54.

Validate NAPs (Step 214)

This process validates the one or more NAPs 54 derived using the "Search for Coded Locations" and "Evaluate CFAs" processes. If these validations are satisfied, processing will continue with the "Search for Route Plans" process. In one embodiment, the design engine 12 may perform one or more of the following validations, in any suitable combination, in any suitable order, and without limitation.

First, design engine 12 determines whether both NAPs 54 are coded locations. If not, the automatic design process may terminate such that the user 20 may need to design the target circuit manually. As noted above, NAPs 54 are preferably network locations 40 that support enough traffic to warrant a coded location name. Second, if both the NAPs 54 represent the same network location 40, then the automatic design process may terminate and the circuit may need to be manually designed. This is since in one embodiment, circuits whose NAPs 54 are equivalent do not fit the automatic design model, which relies on the definition of a route plan 16 with two different end points 34 (route point groups 38). Third, design engine 12 determines whether both of it the NAPs 54 are in the same route point group 38. If so, the target circuit may need to be manually designed. Similar to the explanation above, in one embodiment NAPs 54 for a target circuit must reside in different route point groups 38 since a route plan 16 must connect two distinct end points 34 (route point groups 38) to be valid. These or other validations may be performed according to particular needs.

Search for Route Plan (Step 108)

Referring once again to FIG. 4, this process searches for one or more route plans 16 using route point groups 38 derived in the "Validate NAPs" process. In one embodiment, this process will not execute if the NAPs 54 were not validated. Because one or more service applications 14 and rate codes may optionally be defined for route plan 16, it may be necessary for design engine 12 to execute several queries to find an acceptable route plan 16. The search for such route plans 16 may involve one or more of the following steps, in any suitable order, in any suitable combination, and without limitation: (1) query for a route plan 16 having the same service application 14 and rate as the target circuit; (2) query for a route plan 16 having the same rate as the target circuit (but no particular service application 14); (3) query for a route plan 16 having the same service application 14 as the target circuit (but no particular rate); and (4) query for a route plan 16 connecting previously derived route point groups 38 (without regard to either the service application 14 or rate). After executing each query, the design engine 12 will evaluate the results. If one or more route plans 16 are returned, then the "Determine NAPs" process has managed to find two valid NAPs 54 and this process has found one or more suitable route plans 16, enabling the automatic design process to continue. Conversely, if no route plans 16 are returned, then design engine 12 may continue its efforts to design the target circuit by executing either the "Search for ACTL/Gateway" process or "Search for Serving Location" process, both of which are described below, as appropriate.

Test for Boundary (Step 110)

This process is executed in instances where valid route point groups 38 (NAPs 54) were found for the target circuit, but a route plan 16 was not. At this point in the automatic design process, design engine 12 preferably will not give up on the design despite its inability to find a route plan 16, instead attempting to find another way to design the target circuit. In one embodiment, to determine how to proceed, the design engine 12 must determine whether an ACTL/ gateway is needed.

In one embodiment, the design engine 12 determines whether the target circuit crosses a boundary, which represents a geographic service area (typically defined by an appropriate regulatory body) used to restrict operations of the network provider. For example, in North America, a boundary may separate two Local Access and Transport Areas (LATAs) served by different LECs. Elsewhere, a boundary might be a national border. Regardless of the particular boundary or its general definition, when a target circuit crosses a boundary an ACTL/gateway may be required for regulatory or other reasons. If design engine 12 determines that the target circuit crosses a boundary, then the design engine 12 proceeds to the "Search for ACTL/ Gateway Process" described below. Otherwise, the design engine 12 proceeds to the "Search for Serving Location" process described below.

Search for ACTL/Gateway (Step 112)

As described above, this process is executed when NAPs 54 are valid, a route plan 16 has not been found, and the target circuit crosses a boundary. The goal of the process is to find an ACTL/gateway that the target circuit can use to cross the boundary on the way to its end point 34. The first step is to determine whether the NAP 54 in question is an ACTL (or an analogous network location 40 not explicitly defined as an ACTL) and in a route point group 38. If so, then the NAP 54 should fulfill the ACTL requirement and the remaining steps of this process may be omitted. However, if the NAP 54 is not an ACTL, design engine 12 executes a query to find all ACTLs in the bounded area. If the result set from this query is empty, the automatic design process may terminate and the circuit may need to be manually designed. This is because the target circuit requires an ACTL/gateway in its design, due to crossing of the boundary, but one could not be found within the bounded area.

If one or more ACTLs are found, then the design engine 12 creates a list of ACTL locations to which NAP 54 is directly connected and, in one embodiment, sorts the list in ascending order by distance (the ACTL closest to NAP 54 is sorted to the top of the list). Design engine 12 tests the first ACTL to determine whether it is in a route point group 38. If so, the design engine 12 analyzes the path from the ACTL to NAP 54 to determine whether the path is suitable. If the path is deemed unsuitable, design engine 12 evaluates the next ACTL in the list in the same manner. There may be situations where a path is found but is nonetheless rejected, as an example, where it contains a SONET ring and NAP 54 is a node on the SONET ring. In this case, the path may be rejected because it may lead to an impractical design. In a particular embodiment, this process attempts to build two sets of up to three ACTLs each, for each end point 34 of the target circuit.

Even if there are no direct connections from NAP 54 to an ACTL, it may not necessarily mean that no ACTLs serve NAP 54. It may mean, however, that an ACTL is indirectly connected to NAP 54 through an intermediate serving office. Therefore, design engine 12 will preferably continue its search accordingly. In one embodiment, design engine 12 revises NAP 54 to be the LSO, COEA, SWC, or other serving office discovered using the "Profile Locations on Service Request" process and executes very similar steps, searching for a direct connection from the serving office to an ACTL. As an example, suppose that the initial search for ACTLs came up empty. The LSO may then be substituted for the original NAP 54 and the search repeated. If an ACTL is not found using the LSO, then the COEA may be substituted for the LSO, then the SWC for the COEA, and so on. A suitable homing plan may be used to determine the ACTL closest to the serving office. Ultimately, if the design engine 12 is unable to find any connection to an ACTL from the LSO, COEA, SWC, or other serving office, then the automatic design process may terminate and the target circuit may need to be manually designed.

Figure 7:
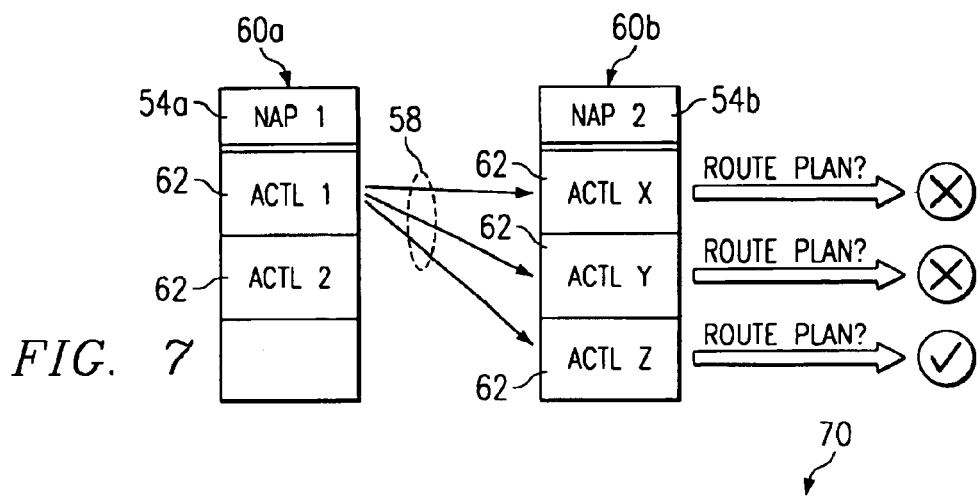
FIG. 7 illustrates an exemplary cross-comparison between sets of Access Customer Terminal Locations (ACTLs) to find a suitable route plan.

If this process is successful in building the two sets of up to three ACTLs, the search for an applicable route plan 16 can begin. Design engine 12 cross-compares the elements in the two sets, deriving route point groups 38 for each ACTL and querying for an appropriate route plan 16. FIG. 7 illustrates exemplary cross-comparison 58 between first set 60a containing two ACTLs 62 identified for a first NAP 54a (ACTLs "1" and "2") and a second set 60b containing three ACTLs 62 identified for a second NAP 54b (ACTLs "X," "Y," and "Z"). In this example, it is not until the third attempt (comparing ACTLs "1" and "Z") that a route plan 16 is found. In the worst case (when both sets 60 contain three ACTLs 62 and cross-comparison 58 exhausts both sets 60), nine total attempts would be required. The number of ACTLs 62 in a boundary that might serve a particular NAP 54 may exceed three. In one embodiment, however, the number of ACTLs 62 in a set 60 may be limited to three (or any other suitable number) to provide a relatively rigorous search without unduly compromising performance of design engine 12. Although two sets 60 of up to three ACTLs 62 are described, the present invention contemplates cross-comparison 58 involving any number of sets 60 each containing any number of ACTLs 62, according to particular needs.

Search for Serving Location (Step 114)

As described above, this process is executed when NAPs 54 are valid, a route plan 16 cannot be found, and the target circuit does not cross a boundary. This process continues searching for valid NAPs 54 within the boundary, searching for one or more serving locations to find a set of route point groups 38 satisfying the "Search for Route Plans" process. In one embodiment, design engine 12 checks both previously defined NAPs 54 individually to determine whether either is in a route point group 38. If NAP 54 is already in a route point group 38, then the search for a serving location will not continue with respect to the NAP 54. Conversely, if NAP 54 is not already in a route point group 38, then the search for a serving location will continue with respect to the NAP 54.

In one embodiment, the NAP 54 is further analyzed to determine whether it happens to be a multiplexing location based on the CFA or SCFA. If so, the automatic design process may terminate and the target circuit may need to be manually designed, because as discussed above it may be assumed that multiplexing locations naturally belong in route point groups 38. When a multiplexing location is not in a route point group 38, that assumption is violated.

If the NAP 54 passes this validation, the search for a serving location may begin in earnest. Using the profile created using the "Profile Locations on Service Request" process, this process attempts to find a serving location to use in searching for a route point group 38. Following is a list of profiled locations in one order of preference, although any appropriate order may be used without departing from the intended scope of the present invention: (1) if the LSO for NAP 54 is in a route point group 38, revise NAP 54 equal to the LSO and discontinue the search; (2) if the COEA for NAP 54 is in a route point group 38, then revise the NAP 54 equal to the COEA and discontinue the search; and (3) if the SWC for NAP 54 is in a route point group 38, revise the NAP 54 equal to the SWC and discontinue the search. If none of the profiled locations are in route point groups 38, then in one embodiment all reasonable alternatives at finding a NAP 54 are exhausted and the target circuit must be manually designed. On the other hand, if the NAPs 54 for both ends of the target circuit are identified with route point groups 38, another attempt may be made to find an appropriate route plan 16 using the same algorithm described above in connection with the "Search for Route Plan" process.

Initiate Auto Design (Step 116)

Figure 8:
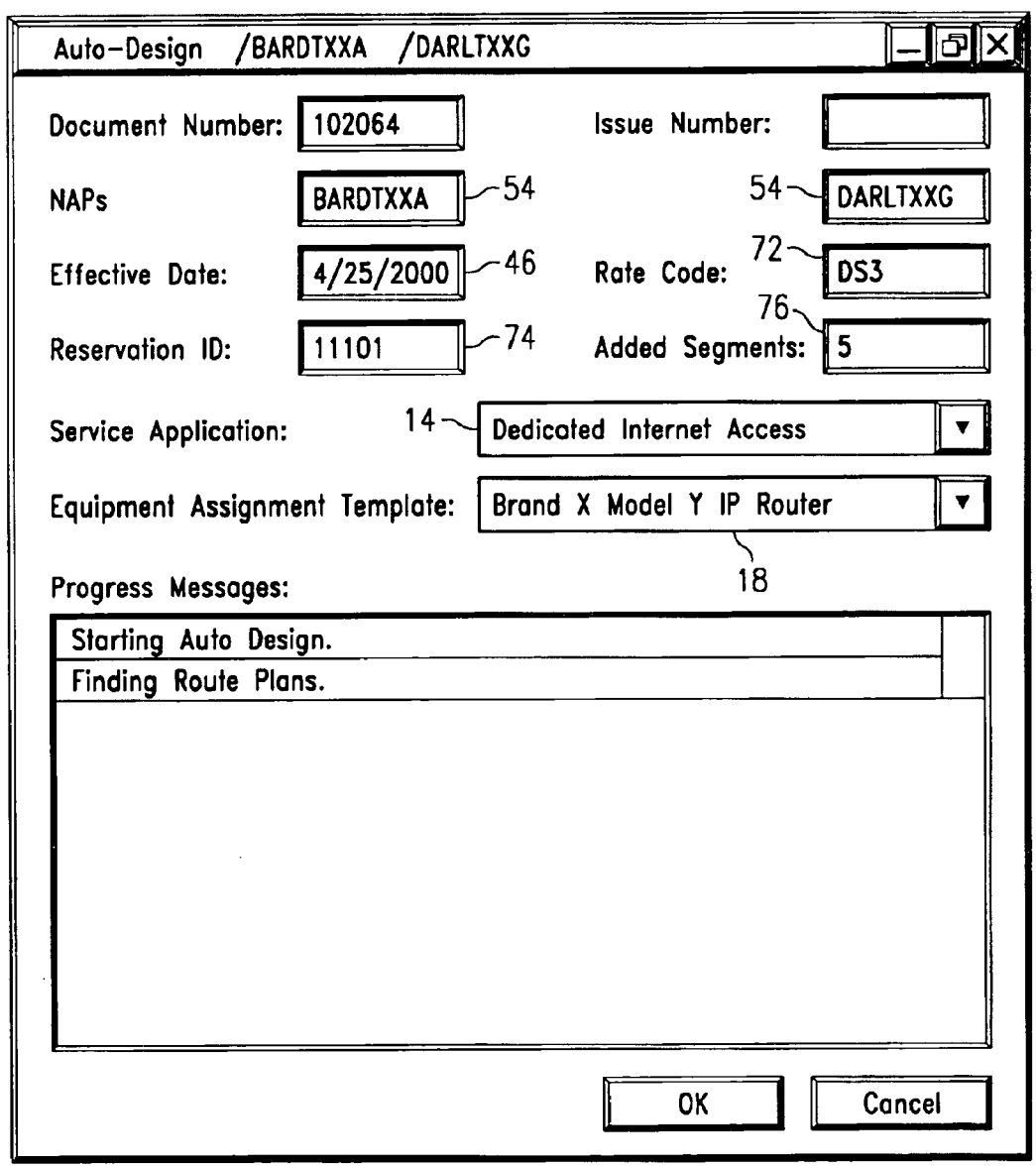
FIG. 8 illustrates an exemplary Auto Design window.

This process initiates the actual automatic design of the target circuit. At this point, all prerequisite processing has occurred and a graphical "Auto Design" window may be presented to user 20. This window displays appropriate data elements used in satisfying subsequent processes. An exemplary "Auto Design" window 70 is illustrated in FIG. 8. In one embodiment, data elements presented using window 70 might include NAPs 54, effective date range 46 (or simply a "From" date), a rate code 72, a reservation identifier 74, a number 76 of additional segments 42 that will be permitted, the service application 14, the EATs 18, and any other suitable data elements for the target circuit, in any suitable combination.

The service application 14 and the EATs 18 may be eligible for user selection, using a "pull down" menu or otherwise. In contrast, the NAPs 54 will preferably be ineligible for user selection, since as described above their selection is system-defined based upon information associated with the target circuit and its originating service request.

The effective date range 46 may be defaulted to extend indefinitely from the current system date, but user 20 may change the effective date range 46 according to particular needs. This may allow the user 20, for example, to "backdate" the design and select route plans 16 that are technically expired but not disabled or deleted. This might be desirable, for example, when an expired route plan 16 fulfills the design better than an unexpired route plan 16.

As indicated, user 20 may be permitted to specify the number 76 of additional segments 42 the target circuit will be allowed to have, beyond the segments 42 already in a selected route 32. For example, in the exemplary route plan 16 described above having end points 34 in Los Angeles to New York, at most three segments 42 (two for route 32a and three for route 32b) will be required. Where the number 76 of additional segments 42 is set to "5" as shown, design engine 12 is limited to a maximum of eight total segments 42 in designing the target circuit (three segments 42 already in route 32b plus five additional segments 42).

In one embodiment, although "Auto Design" window 70 may be displayed under any circumstances, the behavior of window 70 may vary depending upon whether a window start preference is set to "Automatic" or "Manual." If it is set to "Automatic," processing may proceed immediately without user intervention. User 20 may not even be able to change values or settings associated with window 70, the only available option being to unconditionally stop the execution of design engine 12. Conversely, if the window start preference is set to "Manual," window 70 is presented to user 20 but no further system-initiated action will take place. User 20 will be in control of the design and will be allowed to change certain values or settings before allowing the automatic design process to proceed or, if user 20 desires, cancel the automatic design process. Considering the behavior associated with the "Automatic" setting, it is preferable to set this preference to "Manual" until the user 20 is comfortable with window 70 and the circuit designs that design engine 12 is capable of generating.

In one embodiment, if user 20 selects multiple target circuits and requests a "Group Assign" option, design engine 12 executes logic described above to determine whether automatic design is appropriate for the target circuits within the group. If so, "Auto Design" window 70 is presented (preferably in "Manual" mode), and the design engine 12 attempts to automatically design each target circuit serially, simultaneously, or in another appropriate manner. Design engine 12 may essentially ignore any target circuits that are selected but are deemed inappropriate for automatic design, such that these circuits will need to be manually designed. In addition, any target circuits that fail the automatic design process once it begins will remain un-designed after the process completes with respect to any other non-failing target circuits and will thus need to be manually designed.

This process relies on the "Derive Service Application," "Choose EATs," and "Determine NAPs" processes described above to populate "Auto Design" window 70 with suitable data elements. This process also invokes the "Find Route Plans" process described below to find and apply route plans 16 to the design.

Find Route Plans (118)

This process searches for route plans 16 for the target circuit using data received from the "Initiate Auto Design" process. In one embodiment, route plans 16 must be enabled to be eligible for selection. In addition, to be selected, a route plan 16 must terminate at the NAPs 54 defined in the "Determine NAPs" process and must be valid according to the user-specified or other effective date range 46.

In addition to these fundamental criteria, the search for route plans 16 may also involve searching for route plans 16 that match the service application 14 and rate for the target circuit, analogous to the "Search for Route Plan" process described above. This process searches for route plans 16 using one or more of the following steps, in any suitable order, in any appropriate combination, and without limitation: (1) query for a route plan 16 having the same service application 14 and rate as the target circuit; (2) query for a route plan 16 having the same rate as the target circuit (but no particular service application 14); (3) query for a route plan 16 with the same service application 14 as the target circuit (but no particular rate); and (4) query for any route plan 16 connecting the route point groups 38 derived earlier (without regard to either service application 14 or rate).

Once a step returns one or more route plans 16, the search will stop. In one embodiment, design engine 12 will build a list of the route plans 16 returned, sorted in order of their effective date ranges 46 beginning with the most recently effective. If no route plans 16 are found, the automatic design process will terminate and the target circuit will need to be manually designed. This process provides the "Qualify Routes" process, described below, with its input (a list of one or more route plans 16).

Qualify Routes (Step 120)

Once one or more route plans 16 have been found, this process evaluates each route plan 16 (and its component routes 32) to select a particular route 32 to use. This process takes into account parameters defined for each mute 32 in each route plan 16, in one embodiment including relative priorities 44 and allocation percentages. Once a suitable route 32 has been selected (based on priorities 44, allocation percentages, or other factors), design engine 12 further evaluates route 32 to determine whether each segment 42 along the route 32 is capable of supporting the target circuit.

In one embodiment, for each segment 42, design engine 12 queries for all "in service," non-protected, and unassigned facilities between the terminating points (route point groups 38) of the segment 42. As described above, design engine 12 may search for facilities independent of the associated physical layer technologies. These queries may be further limited to facilities whose capabilities are consistent with the service application 14 and rate code of the target circuit. If the service application 14 has no defined capabilities, preferably only facilities that have no defined capabilities will be included. If the target circuit is one of multiple diverse circuits within a diversity set, design engine 12 may uphold suitable facility diversity rules in querying for facilities. If design engine 12 encounters a segment 42 that lacks full connectivity between its terminating points (route point groups 38), the design engine 12 discards the associated route 32 and continues with the next route 32 in the list. Although qualification with respect to facilities is described, the present invention contemplates qualifying one or more routes 32 with respect to facilities, equipment, or other suitable circuit elements, individually or in any suitable combination.

Ultimately, if all route plans 16 and constituent routes 32 have been exhausted without success, the automatic design process may terminate and the target circuit may need to be manually designed. However, if one or more routes 32 are qualified, then design engine 12 performs circuit path analyses as described below.

Analyze Circuit Path (Step 122)

This process searches for an actual path through the network 50 that satisfies a candidate route 32 evaluated in the "Qualify Routes" process described above. In one embodiment, design engine 12 may implement this path analysis according to a user-specified or other precision. Types of precision available to the design engine 12 may include, without limitation, intermediate network locations 40 with the same 11-byte codes, the same 8-byte ("building-to-building") codes, or a combination of the same 8-byte and the same 11-byte codes. As an example, facilities with common intermediate network locations 40 such as digital cross-connect systems, SONET nodes, or terminal equipment might be the subject of such searches.

Figure 9A:
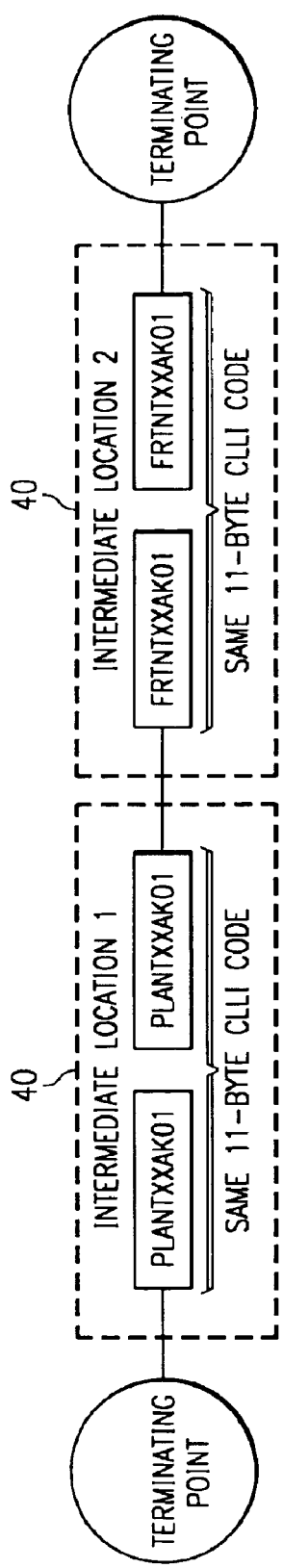
FIGS. 9A through 9C illustrates exemplary types of precision in connection with circuit path analysis.
Figure 9B:
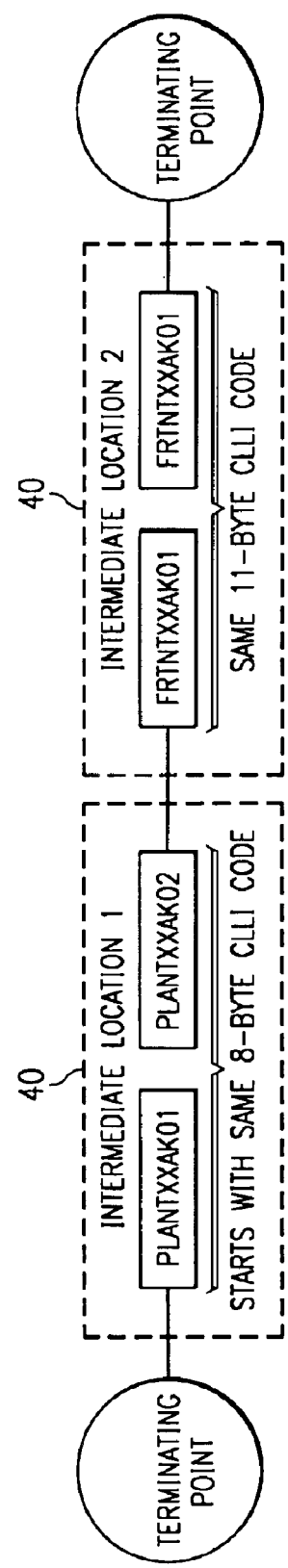
Figure 9C:
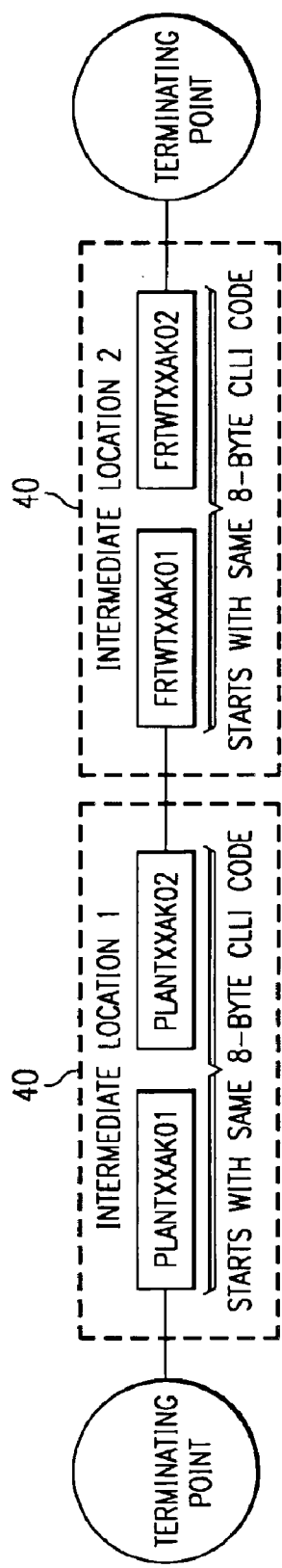

11-byte code precision limits the search to intermediate network locations 40 having matching 11-byte CLLI codes (derived from the two terminating points of the CLF identification for the facility) and provides relatively narrow filtering (thus high precision). FIG. 9A illustrates an example of 11-byte code precision. Precision based on equal 8-byte or 11-byte codes limits the path search to intermediate network locations 40 with matching 8-byte (i.e. beginning with the same eight bytes) or 11-byte CLLI codes (derived from the two terminating points of the CLF identification for the facility), providing broader filtering (thus lower precision). FIG. 9B illustrates an example of 8-byte or 11-byte code precision. Precision based on equal 8-byte codes opens the search to intermediate network locations 40 having matching 8-byte CLLI codes (derived from the terminating points of the CLF identification for the facility), providing even broader filtering (thus even lower precision). FIG. 9C illustrates exemplary 8-byte precision. Although the operations are described as involving CLLI codes, design engine 12 may filter intermediate network locations 40 using any suitable coded location identifiers. Using these or any other appropriate filtering processes, the design engine 12 searches for one or more complete paths between the end points 34 (route point groups 38) of the target circuit.

This basic path analysis functionality may be augmented to take into account reservations, by allowing a route 32 to be analyzed multiple times, or both. In one embodiment, design engine 12 attempts the following steps in order, although one or more steps may be omitted, reordered, or added as appropriate: (1) perform 11-byte precision analysis while considering any reservations, (2) perform 11-byte precision analysis without considering any reservations, (3) perform 8-byte or 11-byte analysis considering reservations, (4) perform 8-byte or 11-byte analysis without considering reservations, (5) perform 8-byte analysis considering any reservations, and (6) perform 8-byte analysis without considering any reservations. Once a valid path is found, that path (and any supplemental information) will be passed to the "Auto Assign Circuit" process, where design engine 12 makes suitable assignments to the target circuit and builds the circuit design. If no path is found for route 32 after having performed these or other appropriate analyses, the design engine 12 will return to the "Qualify Routes" process to search for the next candidate route 32. Although path analyses with respect to defined routes 32 is primarily described, the present invention contemplates design engine 12 performing analogous but more streamlined path analyses based on the end points 34 without regard to route plans 16.

Auto Assign Circuit (Step 124)

Once an appropriate path is found, design engine 12 executes this high-level process to assign circuit elements to the target circuit and build the circuit design (for example, generating a graphical design layout). In one embodiment, design engine 12 makes automatic assignments only to "reserved" or "unassigned" facilities, equipment, or any other circuit elements. If a reservation is included on the circuit order, design engine 12 will first attempt to redeem the reservation. If no reservation is found, the design engine 12 will attempt to assign to unassigned circuit elements. Any queued assignments with pending status (e.g., "facility pending") are preferably not evaluated. After assignments are made, design engine 12 may add corresponding elements to the graphical design layout, if any. A special case in which this process may be skipped occurs when a facility underlying a CFA on a circuit order satisfies the entire circuit design. As described above, design engine 12 may detect this during the "Determine NAPs" process, skip the processing related to route plans 16, convey this condition to user 20 (using "Auto Design" window 70 or otherwise), and redeem the reservation of the CFA to complete the automatic design. If one or more assignment cannot be made (because of database errors, concurrency issues, or any other reason), this process may fail and any assignments made to that point rolled back or otherwise canceled.

This process may invoke and provide input to one or more of the following subordinate processes in making assignments and building the circuit design, in any suitable combination and without limitation.

Assign Channels (Step 126)

This process makes channel assignments in support of the target circuit, if not already handled in the primary "Auto Assign Circuit" process.

Apply EATs (Step 128)

This process assigns equipment to the target circuit according to one or more EATs 18. In one embodiment, EATs 18 may only be applied at the previously defined NAPs 54, although the present invention contemplates applying one or more EATs 18 at any suitable network location 40. Specifically, design engine 12 finds the installed instances of each equipment type or equipment specification in the EAT 18 that have reserved, unassigned, or other available positions, such as available port addresses. To be considered available for assignment to the target circuit, installed equipment should preferably have at least the options defined in the EAT 18 for the equipment type or equipment specification (but may possibly have additional options). When terminating equipment is mapped to a facility to which a target circuit is assigned, this equipment need not be considered on an EAT 18, because it will be retrieved through the facility assignment.

If installed equipment consistent with an EAT 18 cannot be found for network location 40 associated with the NAP 54, or if the equipment can be found but no port addresses or other positions are available, then design engine 12 may indicate on the graphical design layout, if any, that no equipment assignment could be made. Design engine 12 may provide explanatory text, possibly including the name of EAT 18, the name of the equipment type or equipment specification, the CLLI code of the network location 40 (or its name if not a coded location), or other information. In response to each successful assignment, the design engine 12 may generate corresponding lines or other elements on the graphical design layout.

Build Design Layout (Step 130)

This process builds a graphical design layout for the target circuit, based on the assignments made in previous processes. However, there may be situations in which there are "gaps" in the design. For example, suppose that at an intermediate network location 40 the target circuit has been assigned a facility that terminates on the second floor of a building. Suppose further that the target circuit exits the same building on the first floor on a different facility. In this case, there is a gap in the design if the target circuit is not assigned one piece of equipment connecting the inbound and outbound facilities. In order to document such gaps, design engine 12 may generate appropriate indicators for display on the graphical design layout. As another example, this type of indicator might be appropriate when a route 32, component segment 42, or assigned facility does not extend all the way to a NAP 54. The present invention contemplates identifying and documenting, on a graphical design layout or otherwise, any gaps that may exist in the design, according to particular needs.

Complete Auto Design (Step 132)

This process completes the automatic design process. If the process completes normally, design engine 12 notifies the user 20 as to whether the automatic design was successful. If successful, design engine 12 clears all current design violations for this target circuit. If unsuccessful, then the design engine 12 may generate and log design violations. These may be generated, for example, if all routes 32 have been exhausted and no capacity was found, if user 20 declined to use a suggested route 32 (choosing instead to "skip" route 32 when it was presented in "Auto Design" window 70), if the route 32 used for the design has been flagged as a mis-route, if user 20 set the effective date range 46 in the "Auto Design" window 70 such that an expired route plan 16 was selected, if the number of segments 42 exceeds the specified maximum number 76, if route 32 was provisioned in violation of one or more diversity rules, or for any other suitable reason. When a design violation has been logged, corresponding information about the violation may be presented to the user 20 as part of this process.

Although the present invention has been described with several embodiments, a plethora of changes, substitutions, variations, alterations, and modifications may be suggested to one skilled in the aft, and it is intended that the invention encompass all such changes, substitutions, variations, alterations, and modifications as fall within the spirit and scope of the appended claims.

What is claimed is:

1. A software interface for use in designing communications circuits, the software interface operable to:
   receive input from a user;
   in response to the user input, initiate:
   accessing of a route plan comprising a first route point group associated with a first circuit end point, a second route point group associated with a second circuit end point, and one or more routes connecting the first and second route point groups, each route being available for use in designing the circuit;
   selection of a route according to the route plan; and
   automatic assignment of the selected route to the circuit in designing the circuit; and
   provide information to the user reflecting the assignment of the route to the circuit.

2. The interface of claim 1, wherein each route point group comprises one or more network locations available for use in designing the circuit, the selection of the route being initiated without regard to the network locations in the route point groups.

3. The interface of claim 1, wherein the selection of the route is initiated without regard to facilities that underlie the route and which may be available for assignment to the target circuit.

4. The interface of claim 1, wherein the route plan further comprises one or more priorities, each associated with a particular route, the selection of the route being initiated according to its priority.

5. The interface of claim 1, wherein the route plan further comprises one or more allocation percentages, each associated with a particular route, the selection of the route being initiated according to its allocation percentage.

6. The interface of claim 1, wherein the route plan further comprises a third route point group associated with an intermediate point and defining a segment between the intermediate point and an end point.

7. The interface of claim 1, further operable to initiate an automatic determination of a network access point to connect with an end point lying outside of a network containing the routes, the routes connecting with the network access point.

8. The interface of claim 1, further operable to initiate accessing of a network access template to determine how one or more elements outside of a network of the circuit are to access the network.

9. The interface of claim 1, further operable to take customer-specified assignments into consideration in initiating the design of the circuit.

10. The interface of claim 1, further operable to initiate an automatic determination of one or more intermediate locations for the circuit if the end points are not in an inventory of a provider.

11. The interface of claim 1, further operable to initiate an automatic determination of a path for the circuit between two network locations within a particular route point group.

12. The interface of claim 1, wherein the route plan is selected from among a plurality of route plans according to a service application.

13. The interface of claim 12, further operable to initiate an automatic derivation of the service application from an associated circuit order.

14. The interface of claim 13, wherein the initiated derivation of the service application is according to a link associating the service application with information in the circuit order, the information selected from the group consisting of:
   a cataloged service item;
   a service type;
   a service type group;
   a network channel code; and
   a network channel interface code.

15. The interface of claim 14, further operable to initiate selection of a particular service application from among multiple service applications linked to the circuit order according to a link preference.

16. The interface of claim 1, further operable to initiate selection of the route plan from among a plurality of route plans according to a rate associated with the route plan.

17. The interface of claim 1, further operable to initiate:
   accessing of an equipment assignment template (EAT) specifying one or more characteristics of equipment; and
   assignment of equipment to the circuit at one or more points in the selected route according to the EAT.

18. The interface of claim 17, wherein the EAT specifies a particular equipment type for the circuit.

19. The interface of claim 17, wherein the EAT specifies a particular equipment specification for the circuit.

20. The interface of claim 17, wherein:
   each route point group comprises one or more network locations available for use in designing the circuit; and
   the interface is further operable to initiate assignment of equipment to the circuit at one or more network locations according to the EAT.

21. The interface of claim 17, further operable to initiate:
   accessing of a distance threshold associated with the EAT; and
   applying the EAT only if at least a portion of the selected route exceeds the distance threshold.

22. The interface of claim 17, wherein the EAT is selected from among a plurality of EATs according to a service application derived from a circuit order.

23. The interface of claim 1, further operable to initiate:
   assignment of facilities to the circuit;
   assignment of equipment to the circuit; and
   generation of a design layout for the circuit to complete the automatic design of the circuit.

24. The interface of claim 1, further operable to provide information to the user reflecting selection of the route.

25. The interface of claim 24, further operable to receive additional user input in response to selection of the route, the interface initiating assignment of the circuit to the route in response to the additional user input.

26. A software interface for use in automatically designing communications circuits, the software interface operable to:

receive input from a user comprising first and second circuit end points for a circuit to be designed;

in response to the user input, initiate:

accessing of a route plan comprising a first route point group associated with the first circuit end point, a second route point group associated with the second circuit end point, and one or more routes connecting the first and second route point groups, each route being available for use in designing the circuit;

selection of a route according to the route plan; and automatic assignment of the selected route to the circuit in designing the circuit; and provide information to the user reflecting the assignment of the selected route to the circuit.

27. The interface of claim 26, further operable to allow the user to specify a priority for each route within the route plan, the selection of the route being initiated according to its priority.

28. The interface of claim 26, further operable to allow the user to specify an allocation percentage for each route within the route plan, the selection of the route being initiated according to its allocation percentage.

29. The interface of claim 26, further operable to:

initiate an automatic determination of a network access point to connect with an end point lying outside of a network containing the routes, the routes connecting with the network access point; and provide the network access point to the user in response to its determination.

30. The interface of claim 26, wherein the user input further comprises a customer-specified assignment to be considered in designing the circuit.

31. The interface of claim 26, wherein the route plan is selected from among a plurality of route plans according to a service application, the service application being automatically derived from an associated circuit order, the interface further operable to provide the service application to the user.

32. The interface of claim 31, further operable to allow the user to select a different service application to initiate accessing of a different route plan.

33. The interface of claim 26, further operable to:

initiate accessing of an equipment assignment template (EAT) specifying one or more characteristics of equipment;

initiate assignment of equipment to the circuit at one or more points in the selected route according to the EAT; and provide the EAT to the user in response to its assignment to the circuit.

34. The interface of claim 33, wherein the EAT is selected from among a plurality of EATs according to a service application derived from a circuit order.

35. The interface of claim 33, further operable to allow the user to select a different EAT to initiate assignment of different equipment to the circuit.

36. The interface of claim 26, further operable to initiate generation of a design layout for the circuit, reflecting the assignment of the route, to complete the design of the circuit.

* * * * *